United States Patent
Planche et al.

(10) Patent No.: US 12,450,755 B2
(45) Date of Patent: Oct. 21, 2025

(54) SYSTEMS AND METHODS FOR MOTION ESTIMATION AND VIEW PREDICTION

(71) Applicant: Shanghai United Imaging Intelligence Co., Ltd., Shanghai (CN)

(72) Inventors: Benjamin Planche, Cambridge, MA (US); Liangchen Song, Sunnyvale, CA (US); Ziyan Wu, Lexington, MA (US); Meng Zheng, Cambridge, MA (US)

(73) Assignee: Shanghai United Imaging Intelligence Co., Ltd, Shanghai (CN)

( * ) Notice: Subject to any disclaimer, the term of this patent is extended or adjusted under 35 U.S.C. 154(b) by 509 days.

(21) Appl. No.: 17/851,494

(22) Filed: Jun. 28, 2022

(65) Prior Publication Data

US 2023/0419507 A1     Dec. 28, 2023

(51) Int. Cl.
    *G06T 7/246*      (2017.01)
    *G06T 7/90*       (2017.01)
    *G06T 15/20*      (2011.01)

(52) U.S. Cl.
    CPC ............. *G06T 7/246* (2017.01); *G06T 7/90* (2017.01); *G06T 15/20* (2013.01); *G06T 2207/20081* (2013.01); *G06T 2207/20084* (2013.01)

(58) Field of Classification Search
    None
    See application file for complete search history.

(56) References Cited

U.S. PATENT DOCUMENTS

| | | | |
|---|---|---|---|
| 2014/0348434 A1* | 11/2014 | Xu | G06V 10/25 382/228 |
| 2020/0134911 A1* | 4/2020 | van Hoff | G06T 7/292 |
| 2021/0287007 A1* | 9/2021 | Wang | G06V 20/41 |
| 2021/0390761 A1 | 12/2021 | Kowalski et al. | |
| 2022/0036602 A1 | 2/2022 | Duckworth et al. | |
| 2023/0123820 A1* | 4/2023 | Wang | G06N 3/088 345/474 |

FOREIGN PATENT DOCUMENTS

| | | |
|---|---|---|
| CN | 113327299 A | 8/2021 |
| CN | 113888689 A | 1/2022 |
| DE | 102021002798 A1 | 7/2021 |

* cited by examiner

*Primary Examiner* — Sarah Le
(74) *Attorney, Agent, or Firm* — Zhong Law, LLC

(57) ABSTRACT

Described herein are systems, methods, and instrumentalities associated with estimating the motions of multiple 3D points in a scene and predicting a view of scene based on the estimated motions. The tasks may be accomplished using one or more machine-learning (ML) models. A first ML model may be used to predict motion-embedding features for a temporal state of a scene, based on motion-embedding features for previous states. A second ML model may be used to predict a motion field representing displacement or deformation of the multiple 3D points from a source time to a target time. Then, a third ML model may be used to predict respective image properties of the 3D points based on their updated locations at the target time and/or a viewing direction. An image of the scene at the target time may then be generated based on the predicted image properties of the 3D points.

16 Claims, 6 Drawing Sheets

SYSTEMS AND METHODS FOR MOTION ESTIMATION AND VIEW PREDICTION

BACKGROUND

To navigate in and/or interact with a surrounding environment, an autonomous system (e.g., robot) may rely on computer vision to understand the positions and structures of objects in a scene, and/or to predict how those objects may move or deform with time and/or space, e.g., in order to adapt the movement path or trajectory of the autonomous system to avoid collision with the objects. Despite recent technological progress on dynamic scene representation, however, motion estimation and view prediction remain a challenging task, e.g., due to motion ambiguity that may exist among multiple points, spatially or temporally varying lighting conditions that may blur the notion of point identity over time, etc. Accordingly, systems and methods capable of determining an accurate representation of a scene, estimating the motion of objects comprising the scene, and/or accurately predicting an intermediate or future state of the scene may be desirable.

SUMMARY

Described herein are systems, methods, and instrumentalities associated with motion estimation and view (or scene) prediction. An apparatus capable of performing these tasks may comprise one or more processors configured to receive at least one of a target time or a viewing direction associated with a scene, where the scene includes multiple points (e.g., three-dimensional (3D) points) associated with one or more objects. The one or more processors may be further configured to predict, using one or more machine-learning (ML) models, image properties of the multiple points at the target time or in the viewing direction. The one or more ML models may be trained to learn respective motions of the multiple points and a volumetric representation of the scene (e.g., indicating color and/or density attributes of the scene in 3D space) based on a set of training images depicting scene over a time period, and the one or more ML models may predict the image properties of the multiple points based on the respective motions of the multiple points and the volumetric representation of the scene. Based on the image properties of the multiple points predicted by the one or more ML models, the one or more processors of the apparatus may generate an image (e.g., a synthetic image) depicting the scene at the target time, which may be inside the time period covered by the set of training images or outside the time period covered by the set of training images. In the former case, the image generated by the apparatus may be considered an interpolation of the training images, while in the latter case the image generated by the apparatus may be considered an extrapolation of the training images.

In examples, the one or more ML models described herein may include a first ML model, a second ML model, and a third ML model. The first ML model may be trained to determine a plurality of features associated with the scene that may indicate a motion of the scene (e.g., respective motions of the multiple points of the scene) from a source time (e.g., inside the time period) to the target time. The second ML model may be trained to determine, based on the plurality of features determined by the first ML model, a motion field indicating respective locations of the multiple points in the scene at the target time, while the third ML model may be trained to predict the image properties of the multiple points at the target time or in the viewing direction based on the respective locations of the multiple points indicated by the motion field.

In examples, the respective image properties of the multiple points predicted by the third ML model may include respective colors or densities of the points at the target time, and the image at the target time may be generated sampling a plurality of points along the viewing direction, determining the respective image properties of the plurality of points, and aggregating the respective colors of the plurality of points based on the respective densities of the plurality of points so as to obtain a pixel value of the image. In examples, the image may be generated without distinguishing different viewing directions, in which case a color of a point (e.g., each of the multiple points described herein) may be assumed to be the same for the different viewing directions.

In examples, the plurality of features that indicates the motion of the scene from the source time to the target time may be derived based on a plurality of motion-embedding basis vectors determined based on the set of training images. In examples, the plurality of features may be derived further based on a set of weights associated with the plurality of motion-embedding basis vectors (e.g., as a dot product of the plurality of motion-embedding basis vectors and the set of weights). In these examples, the first ML model may be trained to predict the set of weights, e.g., based on motion information extracted from the set of training images.

In examples, the first ML model, the second ML model, and the third ML model may be jointly trained based at least on an image reconstruction loss (and/or an additional feature prediction loss). For instance, the joint training of the first ML model, the second ML model, and the third ML model may comprise extracting, using present parameters of the first ML model, a set of features from the training images, where the set of features may indicate a motion from a first time to a second time. The joint training may further comprise determining, using present parameters of the second ML model, an estimated motion field that may indicate the displacement of one or more points in the training images, where the estimated motion field may be determined based at least on the set of features extracted by the first ML model. Additionally, the joint training may comprise predicting respective locations of the one or more points at the second time based at least on the motion field and respective locations of the one or more points at the first time, and predicting, using present parameters of the third ML model, respective image properties of the one or more points at the second time based at least on the respective locations of the one or more points at the second time. Subsequently, an output image may be generated based on the predicted image properties of the one or more points, and the respective present parameters of the first ML model, the second ML model, and the third ML model may be adjusted based at least on a difference between the output image and a ground truth image (e.g., based on an image reconstruction loss).

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
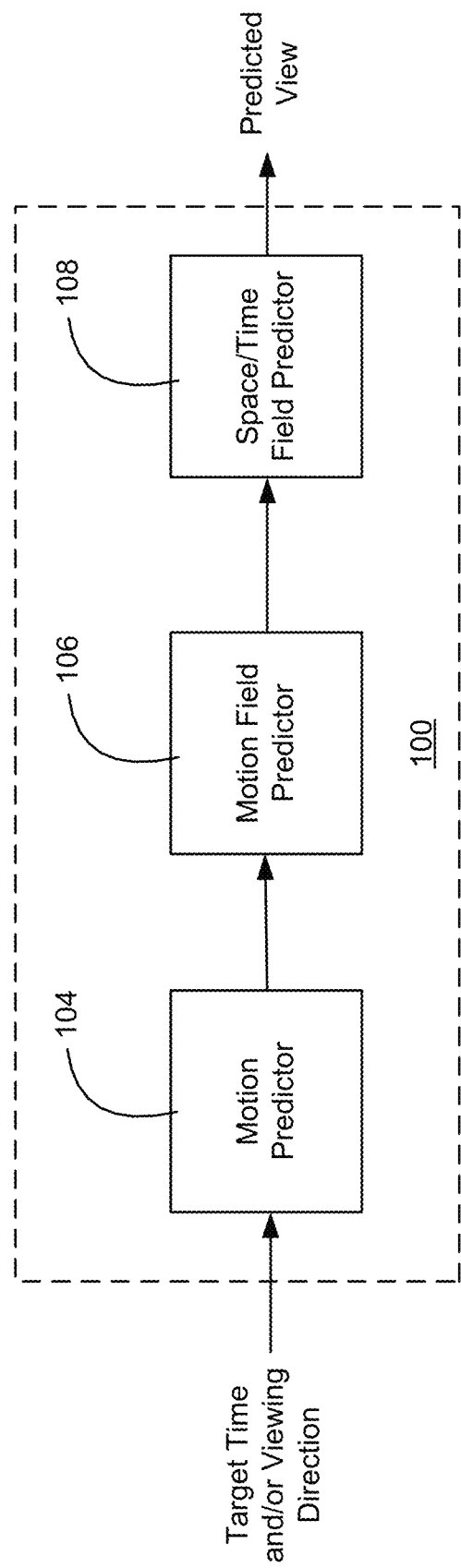
FIG. 1 is a simplified block diagram illustrating example techniques for motion estimation and/or view prediction in accordance with one or more embodiments of the disclosure provided herein.

FIG. 1 illustrates example techniques for motion estimation and view prediction in accordance with one or more embodiments of the disclosure provided herein. As shown, a system or apparatus 100 (referred to herein as a motion view predictor or MVP) capable of performing the motion estimation and/or view prediction task(s) may acquire or be provided with knowledge about the motion and/or appearance (e.g., color, density, etc.) of a scene and subsequently, when given a target time and/or a viewing direction, predict, using one or more machine-learning (ML) models, image properties of multiple points in the scene at the target time or in the viewing direction, and generate an image depicting the scene (e.g., representing a view of the scene) at the target time or in the viewing direction based on the image properties of the multiple points predicted by the one or more ML models. As will be described in greater detail below, the one or more ML models may be trained to learn respective motions of the multiple points and a volumetric representation of the scene (e.g., indicating color and/or density attributes of the scene in 3D space) based on a set of training images that may depict the scene over a time period. The one or more ML models may be further trained to predict the image properties of the multiple points at the target time and/or in the viewing direction based on the respective motions of the multiple points and the volumetric representation of the scene learned from the training images. The multiple points may be associated with one or more objects in the scene (e.g., in the three-dimensional (3D) space of the scene), and may be referred to herein as 3D points. All or a subset of these 3D points may exhibit a motion during the time period (e.g., 0 to T) covered by the training images, and each training image may depict a state of the scene at a respective time (e.g., $t_0$, $t_1$, $t_2$, $t_3$, etc.) within the time period (e.g., each training image may depict a temporal state of the scene). As such, the respective motions and/or image properties of the multiple points may be learned from the training images (e.g., extracted from the training images) using one or more artificial neural networks, for example, before MVP 100 is deployed for motion estimation and/or view prediction. In examples, the training images may be captured by one or more sensors (e.g., visual sensors such as red-green-blue (RGB) sensors or RGB cameras, depth sensors, thermal sensors, etc.) that may be parts of MVP 100 or the sensors may be communicatively coupled with MVP 100 so as to transmit the images to MVP 100. The sensors may be installed at different locations (e.g., in a medical environment) so that the images captured by the sensors may depict the scene (e.g., objects in the scene) from different points of view (e.g., different viewing directions) over the time period (0, T).

MVP 100 may include a motion predictor (e.g., 104 in FIG. 1) configured to receive at least the target time and determine (e.g., predict), using a first machine-learning (ML) model, a plurality of features (e.g., salient features) that may indicate a motion associated with the scene (e.g., respective motions of multiple 3D points in the scene) from a source time to the target time. The source time may correspond to one of the training images (e.g., the source time may be inside the time period covered by the training images) while the target time may not have a corresponding image (e.g., the target time may be outside the time period covered by the training images or the target time may be inside the time period such as between the time slots associated with two existing training images). MVP 100 may further include a motion field predictor (e.g., 106 in FIG. 1) configured to receive the features extracted by motion predictor 104 and determine, using a second ML model, a motion field that may indicate respective locations of the multiple points in the scene at the target time (e.g., the motion field may indicate displacement of the multiple points from the source time to the target time). Such a motion field may be referred to herein as a dense motion field, e.g., since it may indicate the respective displacements of multiple 3D points in the scene and not just the displacement of an object treated as a single point. Accordingly, using the motion field determined by motion field predictor 106, the respective locations of the multiple points in the scene may be determined for the target time, for example, by determining the amount of displacement of each point from the source time to the target time based on the motion field and applying the displacement to the location of the point in the source image.

MVP 100 may also include a space/time field predictor (e.g., 108 in FIG. 1) configured to predict, using a third ML model, respective image properties of the multiple points at the target time based on the respective locations of the multiple points at the target time, the target time itself, and/or the viewing direction described herein. The image properties predicted by space/time field predictor 108 may include, for example, respective colors and/or densities of the multiple points in the scene. As will be described in greater detail below, a volumetric representation of the scene (e.g., indicating color and/or density attributes of the scene in 3D space) may be acquired or learned through a machine learning process, e.g., by encoding the color, radiance, and/or density information of the scene into one or more neural fields (e.g., memory locations of MVP 100) and subsequently querying the neural fields to obtain the color, radiance, and/or density of a 3D point based on the location of the 3D point, the viewing direction described herein, and/or the target time. By repeating the aforementioned operations for a sufficient numbers of rays (e.g., optical or camera rays), a view (e.g., a synthetic image) of the scene at the target time may be obtained based on the predicted image properties (e.g., colors and/or densities) of the multiple 3D points.

Accordingly, using the example techniques illustrated by FIG. 1, respective motions and image properties of multiple 3D points (e.g., all 3D points) of a scene may be estimated based on existing images (e.g., training images) of the scene, and a view of the scene at a target time and/or in a viewing direction may be predicted (e.g., by generating a synthetic image) based on the estimated motions and image properties of the multiple 3D points. If the target time is inside the time period covered by the existing images, the predicted image/view may be considered an interpolated image/view of the scene, and if the target time is outside the time period associated with the existing images, the predicted image/view may be considered an extrapolated image/view of the scene. Thus, the example techniques disclosed herein may be used to build a machine vision of an environment (e.g., such as a medical or manufacturing environment) by capturing a set of images of the environment (e.g., using one or more of the sensors described herein), acquiring knowledge about the environment from the captured images through machine learning, and obtaining additional (e.g., synthetic) views of the environment using the acquired knowledge. The machine vision may then be used, e.g., by a medical or manufacturing robot, to navigate and/or interact with the environment.

Figure 2:
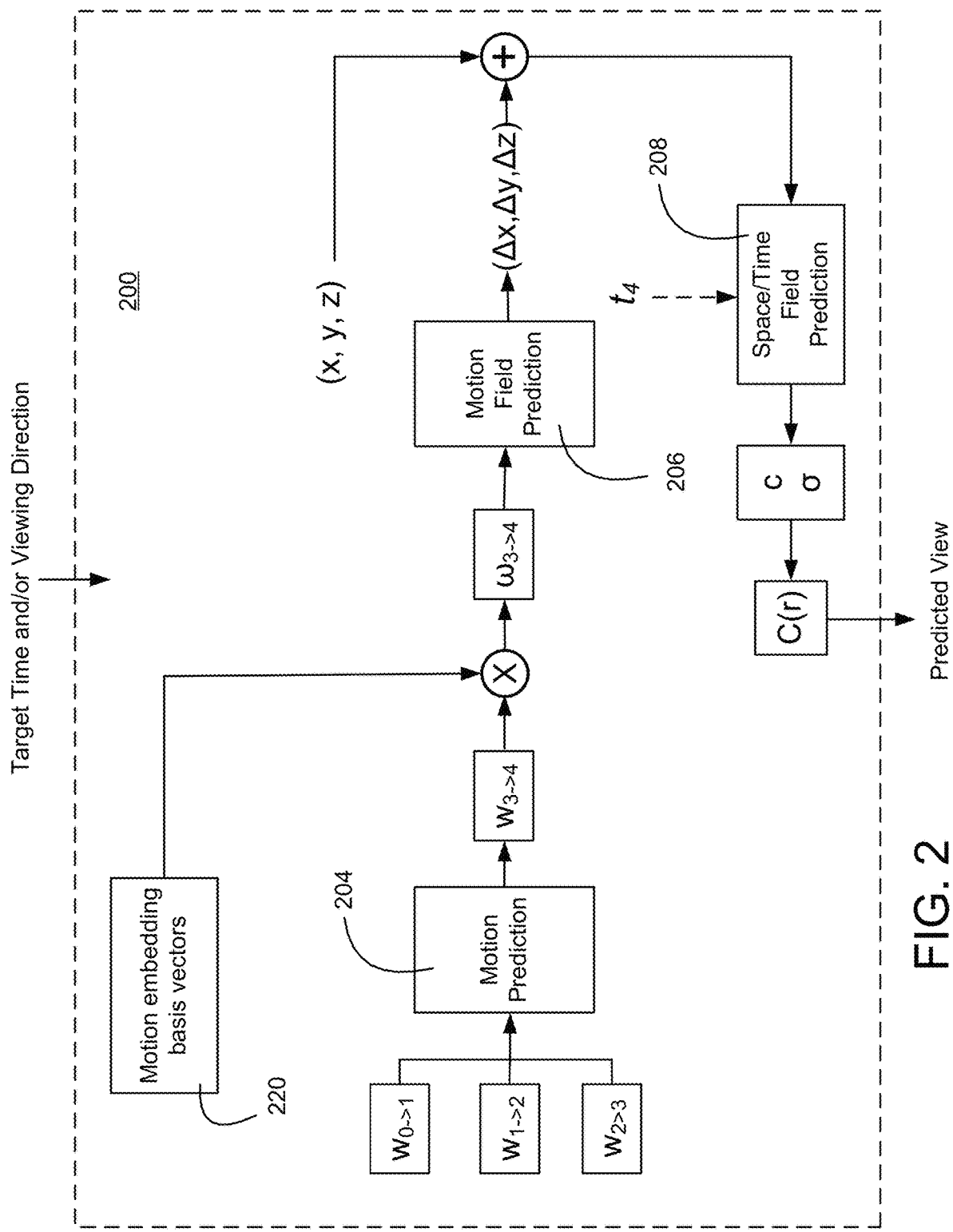
FIG. 2 is a simplified block diagram illustrating example operations that may be associated with motion estimation and/or view prediction in accordance with one or more embodiments of the disclosure provided herein.

FIG. 2 illustrates example operations that may be associated with motion estimation and/or view prediction in accordance with one or more embodiments of the disclosure provided herein. The example operations may be performed by a motion view predictor (MVP) 200 (e.g., such as MVP 100 of FIG. 1), but those skilled in the art will appreciate that such a motion view predictor may not be configured to perform all of the operations shown in FIG. 2 and/or that the motion view predictor may also be configured to perform operations not shown in FIG. 2. As illustrated, MVP 200 may be configured to receive a target time and/or a viewing direction associated with a scene, and predict a view (e.g., generate an image) of the scene at the target time and/or in the viewing direction. MVP 200 may be configured to implement a first ML model 204 (e.g., a motion prediction model) for determining the respective motions of multiple 3D points (e.g., all 3D points) in the scene from a source time to the target time. The first ML model may be learned and/or implemented using an artificial neural network (ANN) (e.g., such as a convolutional neural network), e.g., by training the ANN to extract features from the scene and present (e.g., encode) the extracted features in a suitable format (e.g., as a feature vector) to indicate the respective motions of the multiple 3D points from the source time to the target time. The ANN may acquire the ability to extract these motion embedding features from the scene based on a set of training images that may depict the scene over a time period (0, T) (e.g., the training images may be captured at respective time spots $t_0$, $t_1$, $t_2$, $t_3$, etc. within time period (0, T)). The source time described herein may correspond to one of the training images (e.g., an image captured at $t_0$, $t_1$, $t_2$, or $t_3$), while the target time may be inside the time period (e.g., between $t_2$ and $t_3$) or outside the time period (e.g., a future time $t_4$).

In examples, first ML model 204 may be trained to determine, based on the training images, one or more motion-embedding feature vectors that may encapsulate the dynamics (e.g., motions) of the scene within the time period covered by the training images, and infer, based on the determined motion-embedding feature vectors, an additional feature vector that may be indicate the motion of the scene from the source time to the target time. This operation may be illustrated by Equation 1) below:

$$\omega_{t \to t+\delta t} = P(\omega_{prev}) \quad \quad 1)$$

where $\omega_{t \to t+\delta t}$ may represent a feature vector indicating a motion between times t and t+δt, $\omega_{prev}$ may represent a set of motion-embedding feature vectors extracted from the training images, and P may represent a function performed by the first ML model (e.g., defined by optimized parameters $\theta_p$). For example, the first ML model may be trained to estimate the motion of the scene (e.g., respective motions of multiple 3D points in the scene) based on the training images (e.g., images captured at $t_0$, $t_1$, $t_2$, and $t_3$) and encode the estimated motion into respective motion-embedding feature vectors (e.g., $\{\omega_{0 \to 1}, \omega_{1 \to 2}, \omega_{2 \to 3}\}$) indicating the motion between each image pair. Then, given the target time (e.g., $t_4$), the first ML model may generate a motion-embedding feature vector (e.g., $\omega_{3 \to 4}$) based on the motion-embedding feature vectors determined from the training images, where the newly motion-embedding feature vector (e.g., $\omega_{3 \to 4}$) may indicate the motion of multiple 3D points in the scene from $t_3$ to $t_4$.

In examples, first ML model 204 may be trained to determine the motion of the scene (e.g., respective motions of multiple 3D points in the scene) from the source time to the target time based on a plurality of (e.g., n) motion-embedding basis vectors $B=[b_1, \ldots, b_n]^T$, where $b_i \in R^m$ (e.g., 220 of FIG. 2). For instance, as shown in FIG. 2, first ML model 204 may be trained to generate a feature vector (e.g., $\omega_{3 \to 4}$) that may indicate the motion of the scene between two timestamps (e.g., $t_3$ and $t_4$) based on motion-embedding basis vectors 220 and a set of weights (e.g., $W_{3 \to 4}$) associated with the concerned timestamps (e.g., the feature vector may be determined as a dot product of motion-embedding basis vectors 220 and weights $W_{3 \to 4}$). The plurality of motion embedding basis vectors may be learned from the training images and may be used to estimate the motion between any pair of images or timestamps (e.g., the basis vectors may be shared by the multiple temporal states or images of the scene). For example, through training, first ML model 204 may optimize a first set of weights $W_{0 \to 1}$ that may be applied to motion-embedding basis vectors 220 to derive feature vector $\omega_{0 \to 1}$ indicating the motion between timestamps $t_0$ and $t_1$. First ML model 204 may also optimize a second set of weights $W_{1 \to 2}$ that may be applied to motion-embedding basis vectors 220 to derive feature vector $\omega_{1 \to 2}$ indicating the motion between timestamps $t_1$ and $t_2$. Similarly, first ML model 204 may optimize a third set of weights $W_{2 \to 3}$ that may be applied to motion-embedding basis vectors 220 to derive feature vector $\omega_{2 \to 3}$ indicating the motion between timestamps $t_2$ and $t_3$. As shown in FIG. 2, the weights (and thus the motion embedding features) associated with one temporal state of the scene (e.g., associated with timestamp $t_4$) may be derived based on weights (and thus motion-embedding features) associated with previous temporal states of the scene (e.g., associated with timestamps $t_0$, $t_1$, $t_2$, and/or $t_3$), thus regularizing the motion representation of the scene through predictability. Once trained and given target time $t_2$, first ML model 204 may determine a set of weights $W_{3 \to 4}$ that may be applied to motion-embedding basis vectors 220 to derive feature vector $\omega_{3 \to 4}$ indicating the motion between timestamps $t_3$ and $t_4$. In this way, the input and/or output space of first ML model 204 may be reduced, leading to faster convergence speed and/or more consistent and smooth motion estimation (e.g., compared to estimating frame-wise motion-embedding vectors ($\omega_{0\to1}$, $\omega_{1\to2}$, and $\omega_{2\to3}$, and then using these vectors to derive $\omega_{3\to4}$).

The first ML model described herein may be implemented and/or learned using an artificial neural network such as a convolutional neural network (CNN) comprising a plurality of convolutional layers, one or more pooling layers, one or more recurring layers, and/or one or more fully-connected layers. Each of convolutional layers may include a plurality of convolution kernels or filters having respective weights (e.g., corresponding to parameters of the first ML model) that may be configured to extract features from an input image. The convolution operations may be followed by batch normalization and/or an activation function (e.g., such as a rectified linear unit (ReLu) activation function), and the features extracted by the convolutional layer may be down-sampled through the one or more pooling layers and/or the one or more fully connected layers to obtain a representation of the features, e.g., in the form of a feature map or feature vector.

The feature representation (e.g., motion-embedding feature vector $\omega_{3\to4}$) obtained using first ML model 204 may be provided to a second ML model 206 (e.g., a motion field prediction model defined by parameters $\theta_M$) trained for decoding the feature representation and deriving, based on the decoded features, a motion field that may indicate the displacement and/or deformation of multiple 3D points (e.g., all 3D points) in the scene from the source time to the target time. Since the respective locations of the multiple 3D points in the scene may be known at the source time (e.g., based on an image captured at the source time), the motion field may be used to determine the respective locations of the multiple 3D points at the target time based on the displacement and/or deformation indicated by the motion field. For instance, the location of a 3D point at the target time may be determined by applying the displacement and/or deformation (e.g., ($\Delta x$, $\Delta y$, $\Delta z$)) of the 3D point to the location (e.g., (x, y, z)) of the 3D point at the source time.

In examples, the second ML model may be implemented and/or learned using an artificial neural network such as a multi-layer perceptron (MLP) neural network or a convolutional neural network as described herein. In examples, the artificial neural network may include multiple fully-connected layers configured to take N input values (e.g., N may equal to the dimensions of the features provided by first ML model 204), map them to larger dimensions through one or more fully-connected layers, and then reduce the dimensionality through one or more final fully-connected layers to derive the motion field described herein.

The target time locations of the multiple 3D points determined using the second ML model may be provided to a third ML model 208 (e.g., a space/time field prediction model defined by parameters $\theta_F$) to determine respective image properties (or image attributes) of the multiple 3D points at the target time. In examples, third ML model 208 may include a coordinate-based neural network trained over a set of observations of the scene (e.g., training images of the scene captured from different viewpoints and/or at different times) to encode geometry (e.g., occupancy and/or distance), radiance (e.g., color), and/or density (e.g., opacity) information associated with the scene into a plurality of neural fields (e.g., memory locations storing space, time, and/or image properties of the scene) such that a view or image of the scene may be subsequently predicted by querying the neural fields based on the respective locations of 3D points in the scene, a viewing direction, and/or a time of interest (e.g., target time $t_4$). This operation may be illustrated by Equation 2) below:

$$F(v_t, d_t, t; \theta_F) = \{c_t, \sigma_t\} \quad 2)$$

where F may represent the function performed by third ML mode 208, $\theta_F$ may represent the parameters of the third ML model, t may represent a target time of interest, $v_t$ may represent a 3D point in the scene, $d_t$ may represent a viewing direction (e.g., defined by a vector), $c_t$ may represent a color (e.g., an observed radiance) at the 3D point, and $\sigma_t$ may represent a density (e.g., opacity) of the 3D point.

Once the image properties of the scene are learned through training, they may be queried to predict a view (e.g., render a synthetic image) of the scene at the target time, e.g., using one or more volume rendering techniques (e.g., represented by C(r) in FIG. 2). For instance, for each of multiple camera rays r (e.g., of a virtual camera) defined by an optical origin o and a direction d intersecting a pixel, the color of the pixel may be determined by sampling points along the camera ray (e.g., sampling $p_i = o + id$), querying respective image properties or attributes (e.g., color and/or density) of the sample points from the neural fields, and accumulating the image properties or attributes of the sample points to obtain a pixel value. For example, if a sample point along the camera ray r has a density value of 0, this point may be considered "transparent" and its color may not impact the aggregated color of the pixel. If a current sample point along the camera ray has a density of 1, this point may be considered to be on a solid surface and the colors of other points behind it may not impact the aggregated color of the pixel (e.g., because those points may be occluded). If a sample point on the camera ray has a density value between 0 and 1, the color of this point may be mixed with the colors of other points along the camera ray to obtain the color of the pixel. Using these techniques, a synthetic view or image of the scene may be generated, e.g., by repeating the aforementioned operations over a sufficient number of rays (e.g., 1024 rays).

In examples, the third ML model may be implemented and/or learned using an artificial neural network such as an MLP neural network comprising multiple fully-connected layers (e.g., an input layer, one or more hidden layers, and an output layer) and/or one or more convolutional layers. During the training of such a neural network, a dataset of captured images (e.g., RGB images) of the scene, corresponding camera poses and/or intrinsic parameters, and/or scene bounds may be provided to the neural network. In response, the neural network may sample coordinates (e.g., 5D coordinates representing 3D locations and a viewing direction) along camera rays, feed the sampled coordinates into the MLP to produce a color and volume density, and use volume rendering techniques to composite those values into an image. Since this rendering function may be differentiable, the neural network parameters may be optimized using a gradient descent, e.g., by minimizing the difference between the synthesized image and a ground truth image. In examples, the third ML model may be trained to generate the synthetized image based only on 3D points location (e.g., without a viewing direction). In those cases, the model may assume that the color of a 3D point may be the same for different viewing directions (e.g., with simple or no refraction/reflection), and this technique may help reduce the noise often encountered in dense motion estimation.

Accordingly, through the example operations illustrated by FIG. 2, views or images of a scene from different viewpoints (e.g., represented by the viewing directions described herein) and/or at different times (e.g., either intermediate times or future times) may be predicted (e.g., synthesized) based on existing images of the scene. The prediction may be performed without incurring a significant increase in memory consumption (e.g., due to the use of neural fields), and the prediction may be consistent and smooth (e.g., by representing scene motion states with a set of basis motion vectors). In addition, ambiguities between rigid and non-rigid deformation in the scene (e.g., whether the growth of an element in the scene is because the element is getting closer to an observer or because the volume of the element is truly expanding) may also be reduced because of the regularization provided by the dense modeling of motion (e.g., motion estimation for all 3D points in the scene using the first ML model described herein). For example, the distinction between rigid motion and non-rigid expansion of an object may be ambiguous as seen from a single 2D image, but may be clear when multiple points of the object are represented in 3D. Moreover, by memorizing motion embedding features of the scene that are predictable (e.g., using the first ML model), the techniques disclosed herein may be capable of disentangling true motion from noise, for example, by recognizing and ignoring the changes in an object's image appearance caused by sensor noise, temporary shadowing, etc.

Figure 3:
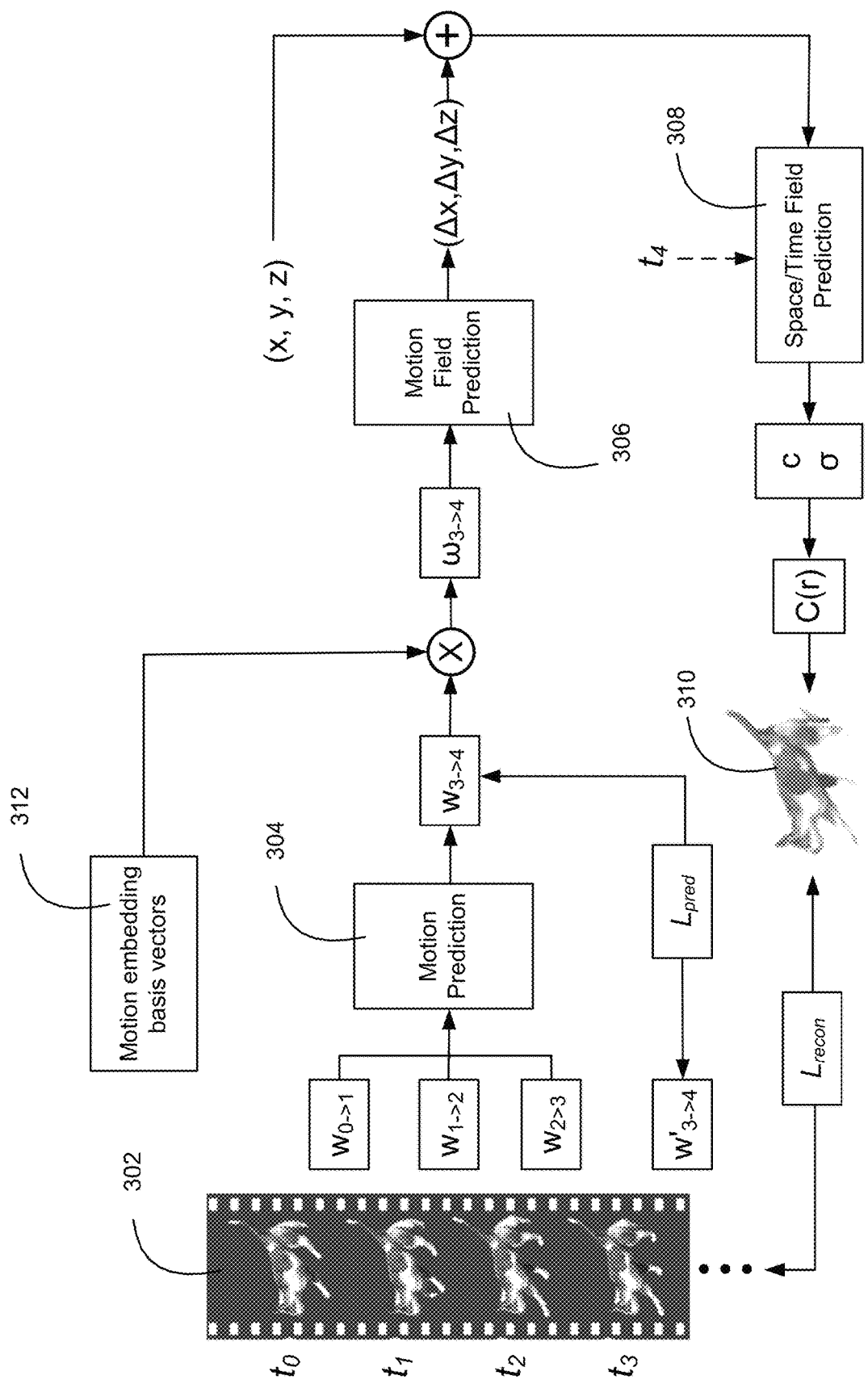
FIG. 3 is a simplified block diagram illustrating examples techniques for training a motion view predictor in accordance with one or more embodiments of the disclosure provided herein.

FIG. 3 illustrates examples techniques for training the motion view predictor described herein (e.g., the neural network(s) or ML model(s) implemented by the motion view predictor) to estimate the motion of a scene and/or predict a view (e.g., image) of the scene. As shown, the training may be conducted using a set of training images 302 depicting the scene over a time period and based on one or more losses such as, e.g., a prediction loss $L_{pred}$ and/or an image reconstruction loss $L_{recon}$. The prediction loss $L_{pred}$ may be determined based on the difference between a predicted motion-embedding feature vector (e.g., $\omega_{3\to4}$) and a sampled ground truth vector, while the image reconstruction loss $L_{recon}$ may be determined based on the difference between a view or image generated by the motion view predictor (e.g., synthesized image 310) and a ground truth image. The training of the multiple ML models (e.g., motion prediction model 304, motion field prediction model 306, and space/time field prediction model 308) may be performed individually or in an end-to-end manner. For example, during the training, image frames 302 (e.g., images having timestamps of $t_0$, $t_1$, $t_2$, $t_3$, $t_4$, etc.) may be sampled from a training dataset and motion prediction model 304 may infer a motion-embedding feature vector $\omega_{3\to4}$ associated with a future image frame (e.g., having timestamp $t_4$) based on one or more preceding image frames (e.g., having timestamps $t_0$, $t_1$, $t_2$, and $t_3$). As described herein, motion-embedding feature vector $\omega_{3\to4}$ may indicate the respective motions of multiple 3D points in the scene from $t_3$ to $t_4$, and the vector may be inferred by predicting a set weights $w_{3\to4}$ based on motion information extracted from the preceding image frames (e.g., represented by weights $w_{0\to1}$, $w_{1\to2}$, and/or $w_{2\to3}$) and applying the weights to a plurality of motion embedding basis vectors 312 that may also be learned from the scene. For example, at the beginning of the training, motion embedding basis vectors 312 may be assigned initial values (e.g., based on randomly sampled values) and, throughout the training, the values of basis vectors 312 may be adjusted (e.g., iteratively with the weights) based on gradient descent of the losses mentioned above (e.g., prediction loss $L_{pred}$ and/or image reconstruction loss $L_{recon}$). Internally, a dot product of the weights and the basis vectors may be calculated to derive a feature representation of a temporal state of the scene at a current time spot (e.g., $\omega_{3\to4}$) based on the features representations of previous states of scene (e.g., calculated as respective dot products of the basis vectors and weights that correspond to the previous timestamps such as $w_{0\to1}$, $w_{1\to2}$, and/or $w_{2\to3}$). By splitting the learning of feature representations for a temporal state into two parts (e.g., weights and basis vectors), the training may converge faster and generate more accurate results. This may be because, for example, the weights associated with each time spot may represent timestep-specific information while the basis vectors may represent inter-timestep information. Together, they may provide more guidance to the neural network(s) while also reduce the overall dimensionality (e.g., number of weights) to be optimized.

The motion-embedding feature vector predicted by motion prediction model 304 may be used by motion field prediction model 306 to estimate a motion field and determine the respective locations of the multiple 3D points at $t_4$. The updated locations of the 3D points may then be provided to space time field prediction model 308 to determine respective image properties (e.g., color and/or density) of the 3D points and generate a synthetic image (e.g., image 310) depicting the scene at $t_4$. The various predictions made through the foregoing operations may be evaluated, for example, by determining a prediction loss $L_{pred}$ and/or an image reconstruction loss $L_{recon}$ based on total or mean squared errors between the prediction results and corresponding ground truths. The losses (e.g., one or more gradient descents associated with the losses) may then be backpropagated through one or more neural networks configured to implement the ML models to adjust the parameters of the neural networks/ML models with an objective to minimize the losses.

In examples, the weights predicted by motion prediction model 304 (e.g., $w_{t\to t+\delta t}$) may be obtained in an online manner and jointly optimized over $L_{pred}$ and $L_{recon}$. For instance, at each training iteration, current frame weights w may be used to compute $L_{pred}$ and optimize the downstream ML models accordingly. The weights themselves may then be optimized with respect to $L_{recon}$. In examples, $L_{recon}$ may be applied to images reconstructed with and without motion reparameterization so as to disentangle appearance related information from motion related information.

Figure 4:
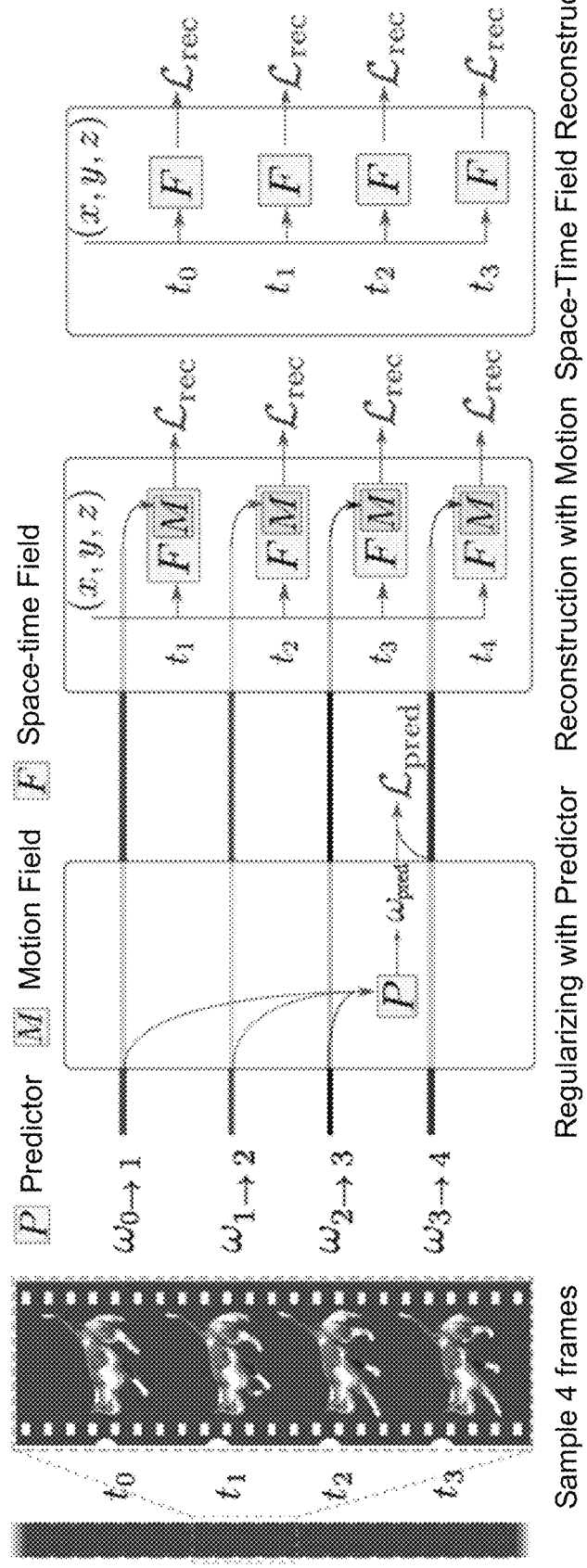
FIG. 4 is a simplified block diagram illustrating example techniques for optimizing a motion view predictor in accordance with one or more embodiments of the disclosure provided herein.

FIG. 4 illustrates an example of optimizing a motion view predictor P (e.g., the neural network(s) or ML model(s) implemented by the motion view predictor) in accordance with one or more embodiments of the disclosure provided herein. As shown, during the optimization (e.g., training), motion predictor P may infer a motion-embedding features vector $\omega$ associated with a fourth image frame based on three preceding image frames. A prediction loss $L_{pred}$ may be determined and used to minimize the difference between the predicted vector and a ground truth, while a reconstruction loss $L_{recon}$ may be determined based on a synthesized image frame generated by the motion view predictor and a ground truth image frame to further optimize the parameters of the ML models. In examples, the prediction and reconstruction losses may be combined and used for the optimization. For instance, the losses may be combined with a balancing parameter $\gamma$, e.g., $L=L_{pred}+\gamma L_{recon}$, where the value of $\gamma$ may be adjusted based on the requirements of each specific use case. In examples, reconstruction loss $L_{recon}$ may be applied with and without motion reparameterization to disentangle appearance related information from motion related information. For instance, the image properties (e.g., color/density) of a 3D point used for the image prediction may be sampled as $F(p+M(p, \omega_{t\to t+\delta t}), t+\delta t)$ and as $F(p, t)$.

Figure 5:
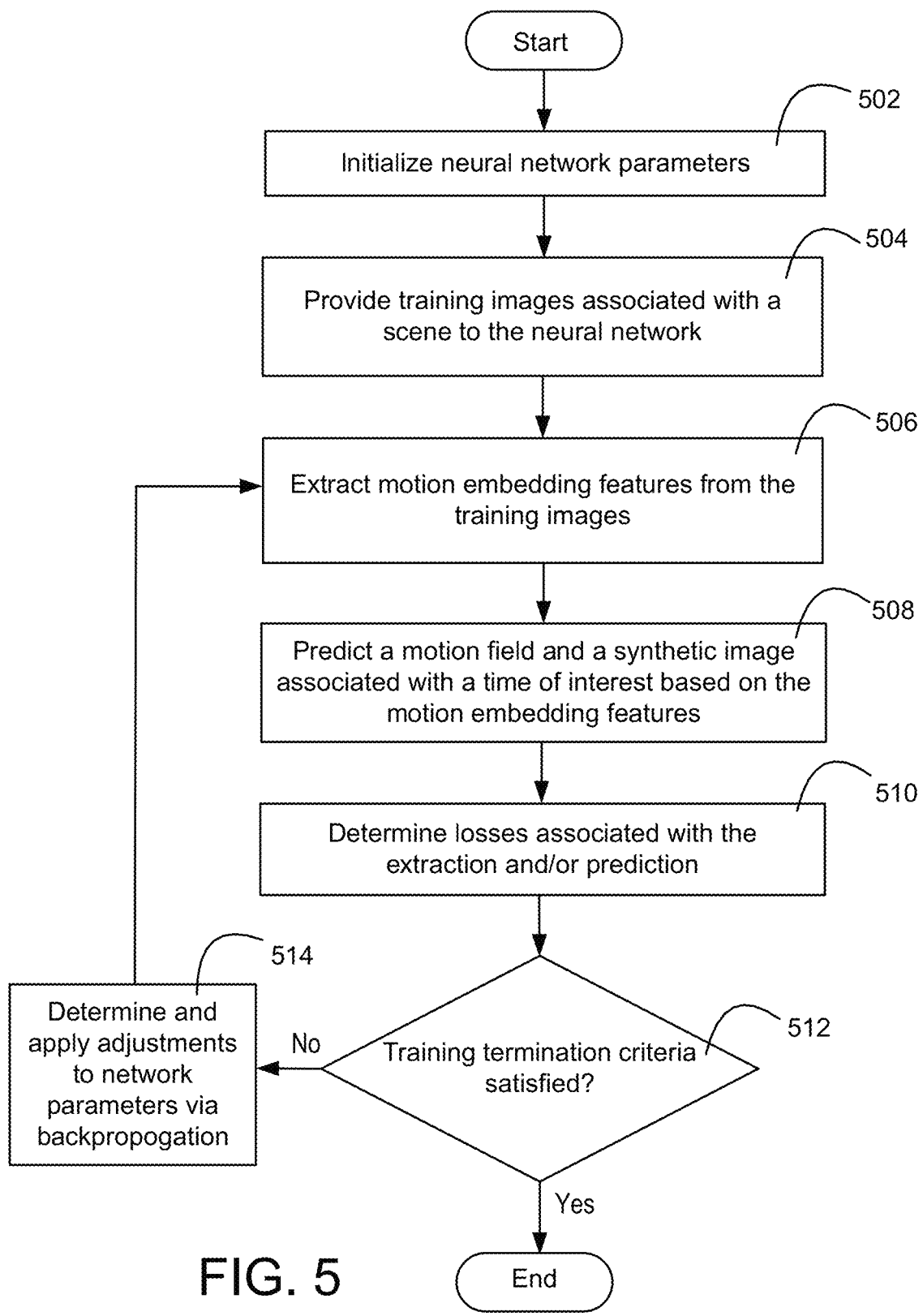
FIG. 5 is a simplified flow diagram illustrating example operations that may be performed for training a neural network in accordance with one or more embodiments of the disclosure provided herein.

FIG. 5 illustrates example operations that may be associated with training one or more neural networks to perform the motion and view prediction tasks described herein. As shown, the training operations may include initializing parameters of the neural network(s) (e.g., weights associated with the various filters or kernels of the neural network) at 502, for example, based on samples collected from one or more probability distributions or parameter values of another neural network having a similar architecture. The training operations may further include providing training data (e.g., a sequence of images associated with a scene) to the neural network(s) at 504, and causing the neural network(s) to extract motion-embedding features associated with a time of interest (e.g., in the form of a feature vector) at 506. Using the extracted features, the neural network(s) may predict a motion field and/or a synthetic image associated with the time of interest at 508. Then, at 510, the neural network(s) may compare the outcome of the aforementioned operations with corresponding ground truth to determine various losses (e.g., a feature prediction loss and/or an image reconstruction loss) associated with the operations. At 512, the losses may be evaluated, e.g., individually or as a combined loss (e.g., with a balancing factor), to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 512 is that a training termination criterion has been satisfied, the training may end. Otherwise, the losses may be backpropagated (e.g., individually or as a combined loss) through the neural network(s) (e.g., based on respective gradient descents associated with the losses or a gradient descent of the combined loss) at 614 before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
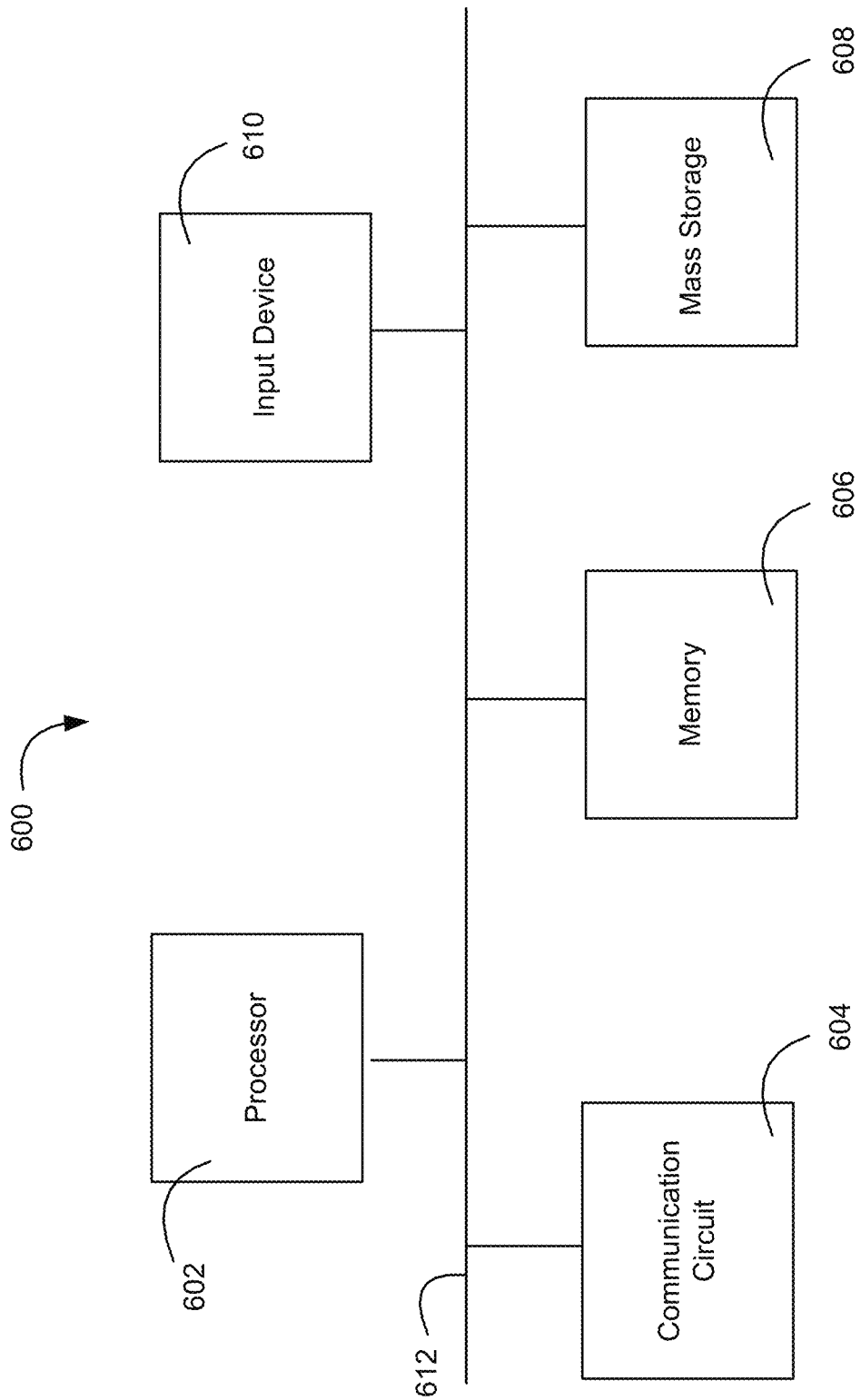
FIG. 6 is a simplified block diagram illustrating example components of an apparatus that may be configured to perform the tasks described in one or more embodiments of the disclosure provided herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the motion estimation and view prediction tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
 receive at least one of a target time or a viewing direction associated with a scene, wherein the scene includes multiple points associated with one or more objects in the scene;
 predict, using at least a first machine-learning (ML) model, a second ML model, and a third ML model, respective image properties of the multiple points at the target time or in the viewing direction, wherein:
  the first ML model is trained to determine, based on multiple motion-embedding basis vectors derived from a set of training images that depicts the scene over a time period, a plurality of features indicating a motion of the scene from a source time to the target time, wherein the source time is inside the time period;

the second ML model is trained to determine, based on the plurality of features determined by the first ML model, a motion field that indicates respective locations of the multiple points at the target time; and the third ML model is trained to predict the respective image properties of the multiple points at the target time or in the viewing direction based on the respective locations of the multiple points indicated by the motion field; and generate an image depicting the scene at the target time or in the viewing direction based on the respective image properties of the multiple points predicted by the third ML model.

2. The apparatus of claim 1, wherein the respective image properties of the multiple points at the target time comprise respective colors and densities of the multiple points at the target time.

3. The apparatus of claim 2, wherein the one or more processors being configured to generate the image depicting the scene at the target time comprises the one or more processors being configured to sample a plurality of points along the viewing direction and aggregate the respective colors of the plurality of points based on the respective densities of the plurality of points so as to obtain a pixel value of the image.

4. The apparatus of claim 2, wherein the one or more processors being configured to generate the image depicting the scene at the target time comprises the one or more processors being configured to assume that a color of a point is the same from different viewing directions.

5. The apparatus of claim 1, wherein the plurality of features that indicates the motion of the scene from the source time to the target time is derived further based on a set of weights associated with the plurality of motion-embedding basis vectors and with the target time.

6. The apparatus of claim 5, wherein the plurality of features is represented by a feature vector derived as a dot product of the plurality of motion-embedding basis vectors and the set of weights.

7. The apparatus of claim 5, wherein the first ML model is further trained to predict the set of weights for the target time based on motion information extracted from the set of training images.

8. The apparatus of claim 1, wherein the first ML model, the second ML model, and the third ML model are jointly trained based at least on an image reconstruction loss.

9. The apparatus of claim 8, wherein the joint training of the first ML model, the second ML model, and the third ML model comprises:

extracting, using present parameters of the first ML model, a set of features from the set of training images depicting the scene, wherein the set of features indicates a motion of the scene from a first time to a second time;

determining, using present parameters of the second ML model, an estimated motion field that indicates displacement of one or more points in the set of training images, wherein the estimated motion field is determined based at least on the set of features extracted using the first ML model;

predicting respective locations of the one or more points at the second time based at least on the motion field and respective locations of the one or more points at the first time;

predicting, using present parameters of the third ML model, respective image properties of the one or more points at the second time based at least on the respective locations of the one or more points at the second time;

generating an output image based on the predicted image properties of the one or more points; and adjusting the respective present parameters of the first ML model, the second ML model, and the third ML model based at least on a difference between the output image and a ground truth image.

10. The apparatus of claim 1, wherein the target time is inside the time period associated with the set of training images or outside the time period associated with the set of training images.

11. A method of view prediction, comprising:

receiving at least one of a target time or a viewing direction associated with a scene, wherein the scene includes multiple points associated with one or more objects in the scene;

predicting, using at least a first machine-learning (ML) model, a second ML model, and a third ML model, image properties of the multiple points at the target time or in the viewing direction, wherein:

the first ML model is trained to determine, based on multiple motion-embedding basis vectors derived from a set of training images that depicts the scene over a time period, a plurality of features indicating a motion of the scene from a source time to the target time, wherein the source time is inside the time period;

the second ML model is trained to determine, based on the plurality of features determined by the first ML model, a motion field that indicates respective locations of the multiple points at the target time; and the third ML model is trained to predict the respective image properties of the multiple points at the target time or in the viewing direction based on the respective locations of the multiple points indicated by the motion field; and generating an image depicting the scene at the target time or in the viewing direction based on the respective image properties of the multiple points predicted by the third ML model.

12. The method of claim 11, wherein the respective image properties of the multiple points at the target time comprise respective colors or densities of the multiple points at the target time.

13. The method of claim 12, wherein generating the image depicting the scene at the target time comprises sampling a plurality of points along the viewing direction and aggregating the respective colors of the plurality of points based on the respective densities of the plurality of points so as to obtain a pixel value of the image.

14. The method of claim 11, wherein the plurality of features that indicates the motion of the scene from the source time to the target time is derived further based on a set of weights associated with the plurality of motion-embedding basis vectors and with the target time.

15. The method of claim 14, wherein the first ML model is trained to predict the set of weights for the target time based on motion information extracted from the set of training images.

16. The method of 11, wherein the first ML model, the second ML model, and the third ML model are jointly trained based at least on an image reconstruction loss.

* * * * *